(12) United States Patent
Wu et al.

(10) Patent No.: US 7,865,885 B2
(45) Date of Patent: Jan. 4, 2011

(54) USING TRANSACTIONAL MEMORY FOR PRECISE EXCEPTION HANDLING IN AGGRESSIVE DYNAMIC BINARY OPTIMIZATIONS

(75) Inventors: Youfeng Wu, Palo Alto, CA (US); Cheng Wang, Santa Clara, CA (US); Ho-seop Kim, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1134 days.

(21) Appl. No.: 11/528,801

(22) Filed: Sep. 27, 2006

(65) Prior Publication Data

US 2008/0126764 A1    May 29, 2008

(51) Int. Cl.
*G06F 9/45* (2006.01)
(52) U.S. Cl. .................. 717/151; 717/146; 717/153; 717/154; 717/159; 717/160; 717/161; 717/136; 717/137; 717/140; 717/141
(58) Field of Classification Search ............... 717/136, 717/137, 140, 141, 145, 146, 149, 151, 154, 717/159, 160, 161
See application file for complete search history.

(56) References Cited

U.S. PATENT DOCUMENTS

| | | | | |
|---|---|---|---|---|
| 5,687,375 | A * | 11/1997 | Schwiegelshohn | 717/129 |
| 5,704,053 | A * | 12/1997 | Santhanam | 717/158 |
| 5,797,013 | A * | 8/1998 | Mahadevan et al. | 717/160 |
| 6,011,908 | A * | 1/2000 | Wing et al. | 714/19 |
| 6,031,992 | A * | 2/2000 | Cmelik et al. | 717/138 |
| 6,832,378 | B1 * | 12/2004 | Beatty et al. | 718/104 |
| 6,938,249 | B2 * | 8/2005 | Roediger et al. | 717/160 |
| 7,516,453 | B1 * | 4/2009 | Bugnion | 718/1 |
| 2002/0092002 | A1 * | 7/2002 | Babaian et al. | 717/137 |
| 2005/0034111 | A1 * | 2/2005 | Martin et al. | 717/141 |
| 2005/0149915 | A1 * | 7/2005 | Wu et al. | 717/137 |
| 2007/0074152 | A1 * | 3/2007 | Roe | 717/104 |
| 2007/0143741 | A1 * | 6/2007 | Harris | 717/121 |
| 2007/0169030 | A1 * | 7/2007 | Tarditi et al. | 717/140 |
| 2007/0169031 | A1 * | 7/2007 | Harris | 717/140 |
| 2008/0005332 | A1 * | 1/2008 | Pande et al. | 709/226 |

OTHER PUBLICATIONS

Ishizaki et al, "A Study of Devirtualization Techniques for a Java™ Just-In-Time Compiler", 2000, ACM, pp. 294-310.*
Ananian et al, "Unbounded Transactional Memory", 2005, IEEE, pp. 316-327.*

(Continued)

*Primary Examiner*—Wei Y Zhen
*Assistant Examiner*—Charles Swift
(74) *Attorney, Agent, or Firm*—Blakely, Sokoloff, Taylor & Zafman LLP

(57) ABSTRACT

Dynamic optimization of application code is performed by selecting a portion of the application code as a possible transaction. A transaction has a property that when it is executed, it is either atomically committed or atomically aborted. Determining whether to convert the selected portion of the application code to a transaction includes determining whether to apply at least one of a group of code optimizations to the portion of the application code. If it is determined to apply at least one of the code optimizations of the group of optimizations to the portion of application code, then the optimization is applied to the portion of the code and the portion of the code is converted to a transaction.

17 Claims, 9 Drawing Sheets

OTHER PUBLICATIONS

Baraz et al, "IA-32 Execution Layer: a two-phase dynamic translator designed to support IA-32 applications on Itantium-based systems", 2003, IEEE.*

Microsoft—IA-32 Execution Layer 4.3—2006—www.microsoft.com/downloads/details.aspx?FamilyId=35620C5-17ED-4638-A39....

Moore et al—Feb. 11-15, 2006—LogTM: Log-based Transactional Memory—(HPCA—12) pp. 1-12.

Baraz et al—(MICRO-36 2003)—IA-32 Execution Layer: a two-phase dynamic translator designed to support IA-32 applications on Itanium-based systems—11 pages.

Gschwind et al—Mar. 2000—Dynamic and transparent binary translation—pp. 54-59.

Rotenberg et al—Dec. 1-3, 1997—Trace Processors—(MICRO-30 Dec. 1-3, 1997).

Ananian et al—Unbounded transactional memory—12 pages.

Patel et al—Dec. 1999—CRHC Technical Report #CRHC-99-16—rePLay: A Hardware Framework for Dynamic Program Optimization—26 pages.

Hammond et al—Transactional Memory Coherence and Consistency—12 pages.

Rajwar et al—(ISCA 05) 2005—Virtualizing Transactional Memory—12 pages.

Adve et al—Sep. 1995—WRL Research Report 95/7—Shared Memory Consistency Models: A Tutorial—pp. Title-28.

Moore et al—(HPCA-12) 2006 Mulitfacet Project—LogTM: Log-Based Transactional Memory—pp. 1-32 Power Point Presentation.

Zheng et al—U.S. Appl. No. 11/241,610, filed Sep. 30, 2005.

Wang et al—U.S. Appl. No. 11/241,527, filed Sep. 30, 2005.

* cited by examiner

USING TRANSACTIONAL MEMORY FOR PRECISE EXCEPTION HANDLING IN AGGRESSIVE DYNAMIC BINARY OPTIMIZATIONS

FIELD

One or more embodiments relate to dynamic binary code optimizations. More specifically, one or more of the embodiments relate to using transactional memory for precise exception handling in aggressive dynamic binary code optimizations.

BACKGROUND

Dynamic binary optimization takes advantage of information discovered at runtime to improve the performance of binary code. Runtime optimizations include reordering code, eliminating dead code, and otherwise streamlining the original binary code.

Dynamic binary optimization may be performed when translating binary code from one instruction set architecture (ISA) to another. For example, binary code may be dynamically optimized when it is dynamically translated from 32-bit Intel® Architecture ("IA32") to a 64-bit Intel architecture ("IA64"). Intel architecture refers to ISAs developed by Intel Corporation of Santa Clara, Calif. For convenience, the original binary code is referred to as "source binary code" and the optimized, translated binary code is referred to as "target binary code."

Often the target binary code is native to and optimized for the machine on which it is being executed. However, the source binary code is often neither native to nor optimized for the machine. Consequently, it is often desirable to perform dynamic optimization when dynamically translating a source binary code to a target binary code. For example, source IA32 code is generally not optimized to take advantage of efficiencies available on machines running IA64 code. Therefore, the IA32 source code may be optimized as well as translated into the target IA64 code. Then, the optimized target IA64 binary code is executed.

Challenges arise when aggressively optimized binary code generates runtime exceptions. Precise handling of these runtime exceptions requires 1) that the order of the exceptions occur in the same order as they would have running the original unoptimized binary code; and 2) that the exception handlers see the same processor states as if the original unoptimized binary code had generated the exceptions.

Straightforward enforcement of precise exception handling may severely constrain dynamic binary code optimizers. For example, a dynamic binary code optimizer may not be able to move a register update down the instruction stream, passing an instruction that may generate an exception, because doing so would change the machine state seen by the exception handler. Also, the optimizer may not be able to reorder two loads that could potentially cause segmentation errors because the reordering changes the order of the possible exceptions raised by the two instructions.

DETAILED DESCRIPTION

Figure 1:
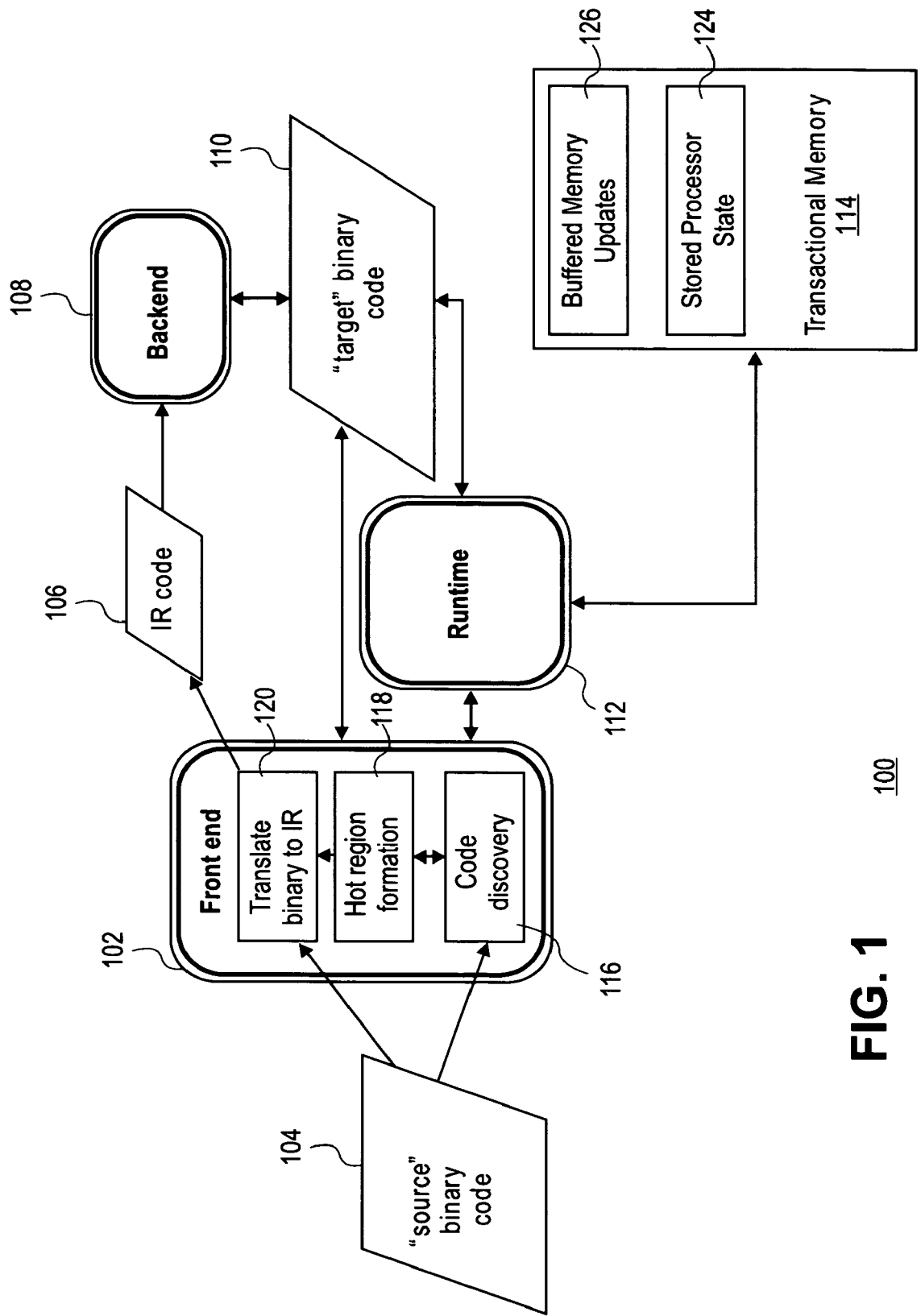
FIG. 1 is a diagram of a dynamic binary code translator and optimizer in accordance with an embodiment of the present invention.

Dynamic binary code optimizers may use transactional memory to provide precise handling of runtime exceptions generated by aggressively optimized binary code. Transactional memory is used to implement transactions—code regions or subregions that when executed, are either atomically committed or atomically aborted.

Transactional memory may be implemented with a variety of memory types. In one embodiment, transactional memory is dedicated memory on a processor. In other embodiments, transactional memory may include on-chip cache memory, off-chip cache memory, dynamic random access memory, memory on storage devices such as, for example, disk drives, or other memory types. In some embodiments transactional memory is limited to the size of a particular physical memory or set of physical memories. In other embodiments, transactional memory is implemented with virtual memory and may be as large as the virtual memory address space permits.

Transactional memory simplifies parallel programming by guaranteeing that transactions appear to execute atomically. As discussed above, a transaction has a property that when it is executed, it is either atomically aborted or atomically committed. In atomic transactions, either all memory operations in the transaction take effect (a "commit") or none does (an "abort"). Atomicity is provided by version management, which handles simultaneous storage of both new and old data. The new data is used if the transaction commits. The old data is retained if the transaction aborts.

On memory stores, the version management implementing atomicity may be eager or lazy. Eager version management writes a new value to memory without waiting for a commit. The old value is retained separately for recovery in case of an abort. Lazy version management waits until there is a commit before writing new values to memory. Meanwhile, the new value is stored on the side to be used if there is a commit.

Transactional memory provides transaction isolation. There are two scopes of isolation, weak isolation and strong isolation. Weak isolation means that the partially-complete state of a transaction is hidden from other transactions. Strong isolation means that the partially-complete state of a transaction is hidden from all the operations outside the transaction, whether they are in a transaction or not.

Isolation is provided by conflict detection. In weak isolation, conflict detection signals a conflict when the write set of one transaction overlaps the read/write set of another concurrent transaction. In strong isolation, conflict detection signals a conflict when the write set of a transaction overlaps the read/write set of any another concurrent operation—regardless of whether it is a transaction.

The conflict detection for strong or weak isolation may be eager (offending load/store is signaled immediately) or lazy (conflict is detected at the transaction commit time). Therefore, there are at least the following four possible transactional memory implementations for either strong or weak isolations.

Lazy version management and lazy conflict detection
Lazy version management and eager conflict detection
Eager version management and eager conflict detection
Eager version management and lazy conflict detection Converting binary application code to transactions works correctly with lazy version management. Furthermore, if the resulting transactions do not contain loops, converting binary application code to transactions also works correctly with strong isolation. Therefore, in some embodiments, transactional memory is implemented with lazy version management and strong isolation, if loops are not allowed inside transactions.

Dynamic binary code optimizers may use transactions to provide precise exception handling for aggressive optimizations that the dynamic optimizer otherwise might forego for lack of precise exception handling capability.

An aggressively optimized binary code region that might generate an exception may be converted to a transaction. Then, if the code generates a runtime exception, the transaction is aborted.

In one embodiment, after the abort, original unoptimized binary code and processor state associated with an entry point to the original unoptimized binary code is retrieved. The original unoptimized binary code is then executed and any exceptions will of course occur in the original order. Thus, precise exception handling is provided.

In another embodiment, if an entire aggressively optimized code region is coded as a transaction, the original unoptimized binary code is reoptimized before being executed. The code is reoptimized less aggressively (foregoing at least some reordering optimizations) and is not coded as a transaction. The less aggressively optimized code is then executed and any exceptions will occur in the original order. Precise exception handling is still provided.

Although aborts are expensive in terms of processing time, they are usually rare. Thus, using transactions for precise exception handling typically results in overall net improvement in dynamically optimized binary code performance.

However, it is desirable to minimize the frequency of aborts. When executing parallel programs, the risk of aborts is greater in transactions that share a variable with another transaction or code region that is being executed in a different thread, process or processor core. The risk of aborts is also greater in transactions having loops, especially spin loops. Therefore, in some embodiments, a code region is not converted to a transaction if it has a shared variable or a loop. A shared variable is a variable that, upon execution of a portion of application code, is to be readable or writable by two or more threads, processes or processors. A code region that is not converted to a transaction is then less aggressively optimized.

A. Dynamic Binary Code Optimizer/Translator

Referencing FIG. 1, in one embodiment a dynamic binary code optimizer/translator 100 uses transactional memory 114 to provide precise exception handling for aggressive dynamic binary code optimizations. Dynamic optimizer/translator 100 includes a front end 102 that performs code discovery 116, hot region formation 118, and translation 120 from source binary code 104 to intermediate representation (IR) code 106.

In code discovery 116, the front end 102 identifies blocks or regions of code. In some embodiments, a code region is a basic block of instructions, usually a sequence of non-branching instructions ending in a branch instruction. In code discovery 116, the front end 102 also translates source binary code (for example, IA32 code) 104 directly to target binary code (for example, IA64 code) 10, without first translating to an intermediate representation. This is sometimes referred to as a cold translation. In some embodiments, some limited binary code optimization is performed with the cold translation. Runtime 112 facilitates the execution of the target binary code 110. Runtime 112 also interfaces with the operating system and responds to runtime exceptions.

As translated code is executed, hot region formation 118 identifies frequently executed code regions and flags them for aggressive optimization by backend 108. Front end 102 then translates 120 these frequently executed code regions from binary code to intermediate representation (IR) code 106 and passes the IR code 106 to backend 108. Generally, IR code 106 is passed to backend 108 in groups of code regions. The backend 108 may then select certain code regions from the groups for particular optimizations, such as aggressive optimization inside a transaction.

Backend 108 aggressively optimizes the IR code 106 and translates it to target binary code 110. A runtime 112 facilitates execution of the target binary code 110 and interfaces with transactional memory 114, in one embodiment through an operating system interface (not shown). In another embodiment, a dynamic optimizer runs below the operating system and does not rely on an operating system interface. Backend 108 identifies code regions or subregions to convert into transactions and interfaces through runtime 112 with transactional memory 114 to effect the conversion of the code regions or subregions to transactions.

If a code region is coded as a transaction, then transactional memory 114 stores buffered memory updates 126 associated with code region instructions that have been executed but not yet committed or aborted. Transactional memory 114 also stores processor state 118 associated with an entry point to source binary code 104 that has been converted to a transaction not yet committed or aborted. Although source binary code 104 is not stored in transactional memory 114, it is retained in memory, for example, in main memory or memory other than transactional memory 114.

If an exception is generated by code in a transaction, the transaction is aborted. In one embodiment, stored processor state 124 and source binary code 104 are used to recover from the exception, as discussed below. In another embodiment, if an entire aggressively optimized region is coded as a transaction, source binary code 104 is reoptimized, but less aggressively and without being coded as a transaction. The reoptimized code is then executed to recover from the exception.

Further referencing FIG. 1, optimizer/translator 100 performs both dynamic optimization and translation. However, in another embodiment dynamic optimization is performed independently and not as part of a code translation.

As previously stated, front end 102 performs translation from source binary code 104 to IR code 106. In an alternative embodiment, this translation is performed by backend 108. In yet another embodiment, source binary code is not translated to IR code 106 at all. Rather, backend 108 performs aggressive optimization directly on binary code.

The front end 102, the backend 108, and runtime 112 are simultaneously translating, optimizing, and facilitating the execution of application code. As used in this disclosure, simultaneous refers both to a single processor core performing multiple tasks concurrently through timeslicing and to actual parallel execution by the cores of a multi-core processor. In either case, runtime information gleaned from the execution of code is used to dynamically optimize the code.

B. Using Transactions for Precise Exception Handling

Figure 2:
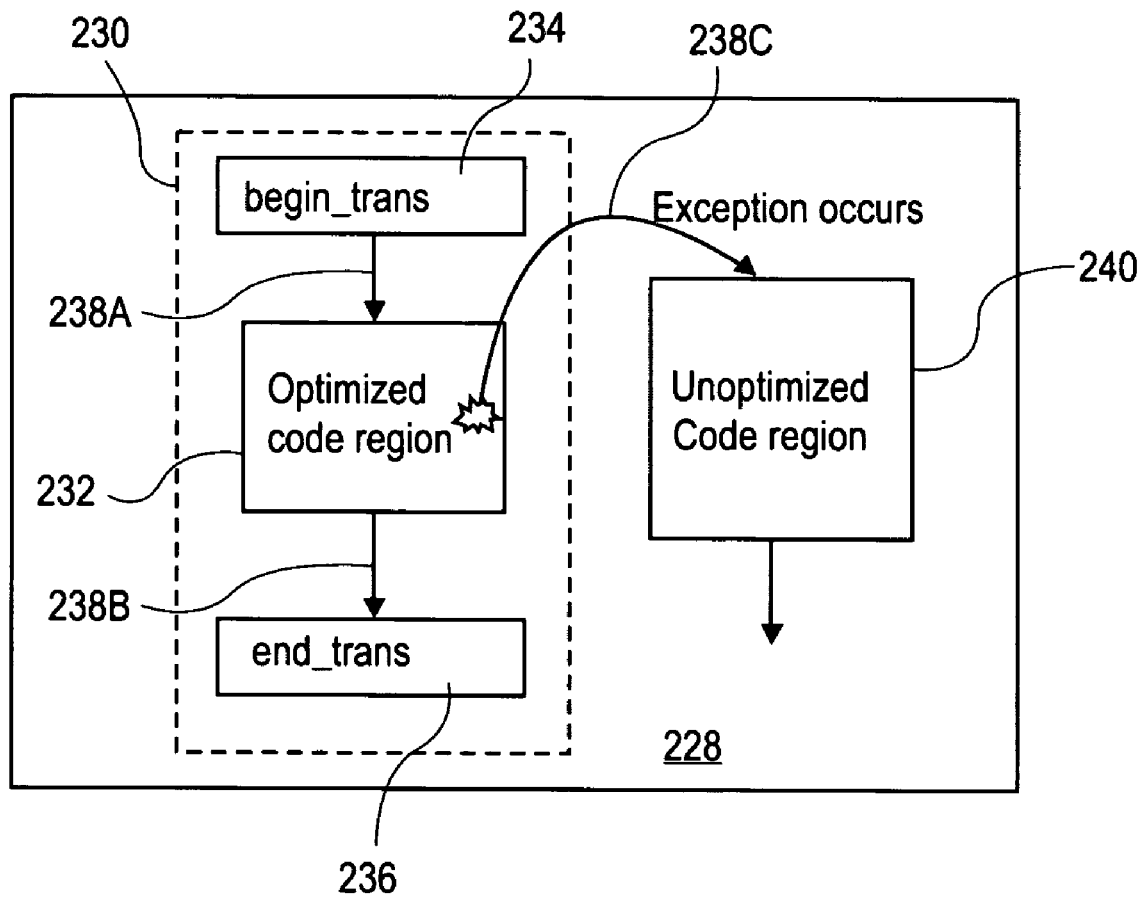
FIG. 2 is a block diagram illustrating a transaction and its use for precise exception-handling in accordance with an embodiment of the present invention.

Referencing FIG. 2, in application code 228, a transaction 230 is used to provide precise exception handling. The transaction 230 includes an optimized code region 232 between a begin-transaction instruction ("begin_trans") 234 and an end-transaction instruction ("end_trans") 236. In the absence of an exception or an abort, a flow of control 238A starts at the begin_trans instruction 236 to the optimized code region 232. A flow of control 238B continues to the end_trans instruction 236.

If the optimized code region 232 generates an exception, a transactional memory mechanism aborts the transaction, recovers minimal states (to be discussed below), and transfers control to an abort handler. The flow of control 238C in such case moves from the optimized code region 232 to an unoptimized code region 240, which is then executed.

Although an unoptimized code region 240 is described above, in another embodiment, flow of control 238C moves to a less aggressively optimized code region. For example, the region is optimized in ways that allow precise exception handling without the support of transactions.

Figure 3:
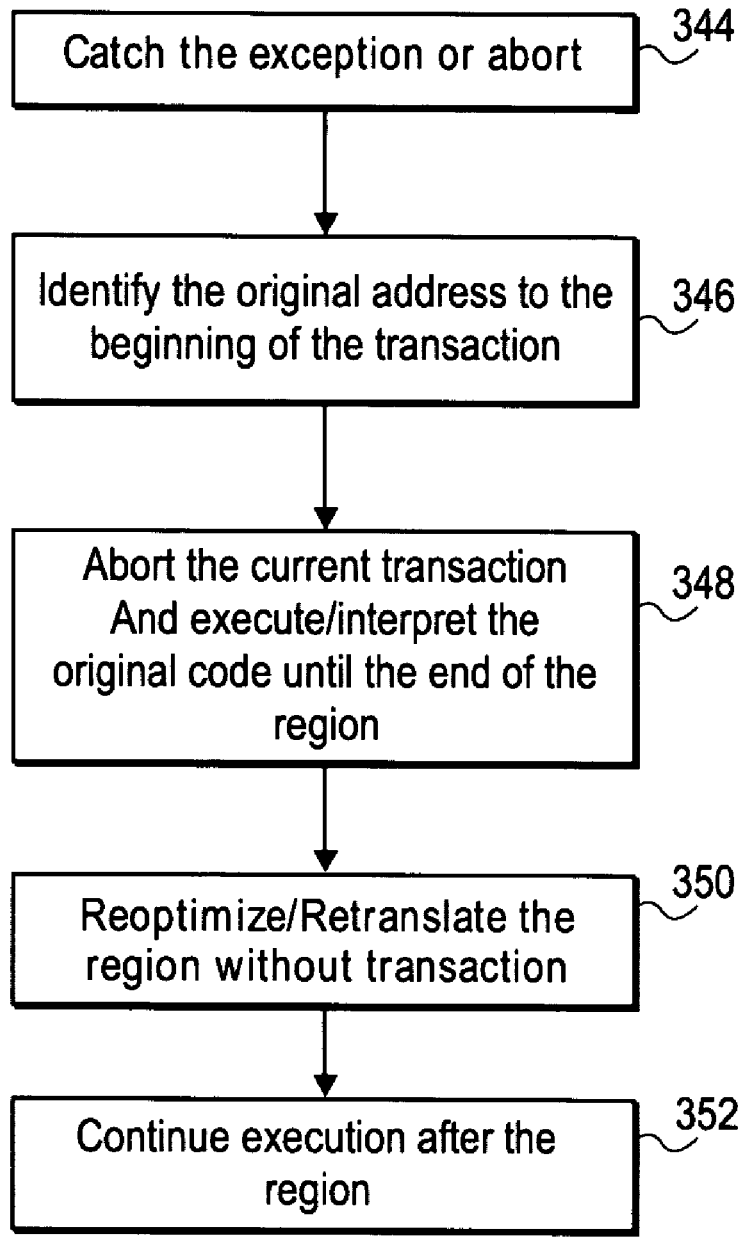
FIG. 3 is a flowchart for precisely handling an exception generated while executing transaction code, in accordance with an embodiment of the present invention.

Referencing FIG. 3, in method 342, consistent with one embodiment, a dynamic optimizer catches an exception or abort that occurs during execution of code in a transaction—a code region coded as a transaction. (Process block 344). In one embodiment, the dynamic optimizer is a dynamic optimizer/translator that optimizes the code region as it translates it from source binary code to target binary code.

The dynamic optimizer identifies the original address for the code at the beginning of the transaction (retry_address). (Process block 346). The dynamic optimizer recovers stored processor state (such as, for example, stored processor state 124 of FIG. 1) and unoptimized code (such as, for example, source binary code 104 of FIG. 1 or unoptimized code 240 of FIG. 2). The transaction is aborted. (Process block 348). Stored memory updates associated with the executed code of the transaction (such as, for example, stored memory updates 126 of FIG. 1) are discarded.

An exception handler executes the unoptimized code with the following conditions satisfied: 1) the order of further exceptions is the same as that of the original code because the original code is being executed; and 2) the exception handler sees the same processor state as if the original code raised the exception because the original processor state was stored and recovered.

The original unoptimized code is executed or interpreted until the end of the region. (Process block 348). After being executed, the original unoptimized code may, in some embodiments, be reoptimized. In the event the dynamic optimizer is also translating the code region, it is reoptimized and retranslated. (Process block 350). The reoptimization/retranslation uses less aggressive optimization techniques that allow precise handling of exceptions without the support of transactions. Application code execution continues after the code region. (Process block 352).

In an alternative embodiment, if an entire code region is coded as a transaction, rather than being executed, the retrieved original unoptimized code is reoptimized, but less aggressively and without being coded as a transaction. The code is reoptimized using less aggressive techniques that allow precise handling of exceptions without the support of transactions. Then, the less aggressively reoptimized code is executed or interpreted. Application code execution continues after the code region.

C. Dynamically Optimizing Code Within a Transaction

Without support from transactional memory, certain optimizations may not be performed because precise exception handling cannot be assured. This is because without transactional memory, there is only a limited ability to buffer old and updated memory state, to checkpoint processor state, and to cancel executed instructions.

For purposes of this discussion, a code region may include both exception instructions (EI) and irreversible instructions (II). "Exception instruction" refers to an instruction that may generate a runtime exception. Examples of exception instructions are loads, stores, and floating point instructions (for example, floating point division).

"Irreversible instruction" refers to an instruction that changes the processor or application state in such a way that, without the use of transactional memory, it may not be possible, at least in some ISAs, to recover a previous processor state to precisely handle an exception. Without transactional memory support, a dynamic optimizer may forego an instruction-reordering optimization that would move an exception instruction past an irreversible instruction. That is because if the exception instruction generates an exception, it may not be possible to recover application or processor states for precise exception handling. Examples of irreversible instructions include store instructions and system call instructions.

However, with transactional memory support, the "irreversible instruction" is not irreversible if it is within a transaction. That is because a transaction may be aborted. With a transaction abort, as described above with reference to FIGS. 2 and 3, processor states associated with an entry point to the original unoptimized code may be recovered. Thus, the conditions for precise exception handling are satisfied.

Figure 4A:
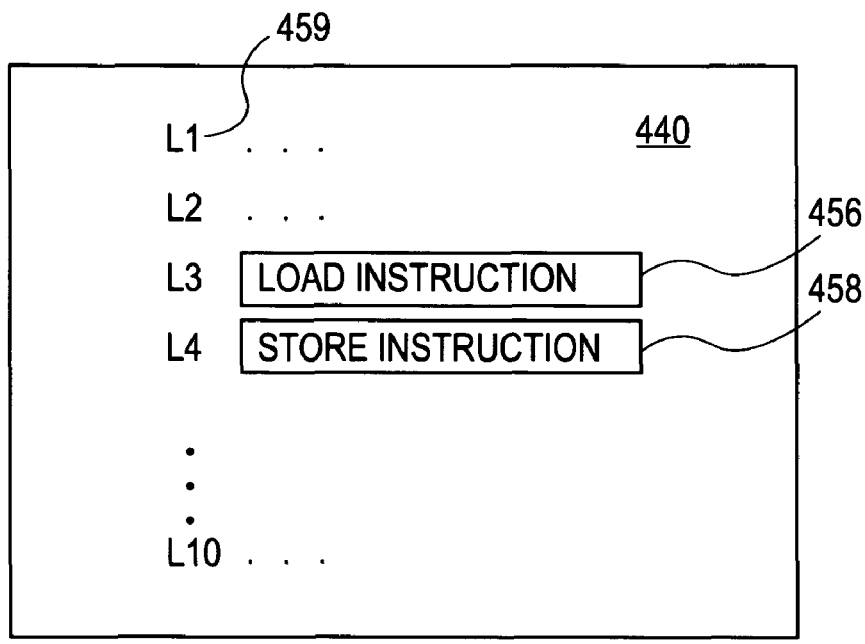
FIGS. 4A and 4B illustrate a method of aggressively optimizing code by reordering a load and a store within a transaction, in accordance with an embodiment of the present invention.

Referencing FIG. 4A, unoptimized code region 440 begins at L1, a load instruction 456, includes a store instruction 458 at L4, and ends at L10. Consistent with the above discussion, store instruction 458 is an "irreversible instruction." For purposes of this discussion, it is assumed that the code would be more efficient if load instruction 456 could be reordered to follow store instruction 458. However, without transactional memory support, it may not be possible to precisely handle exceptions if the dynamic optimizer reorders load instruction 456 to follow irreversible store instruction 458. It may not be possible to recover the processor state of the original unoptimized code region 440 immediately prior to instruction 458.

Figure 4B:
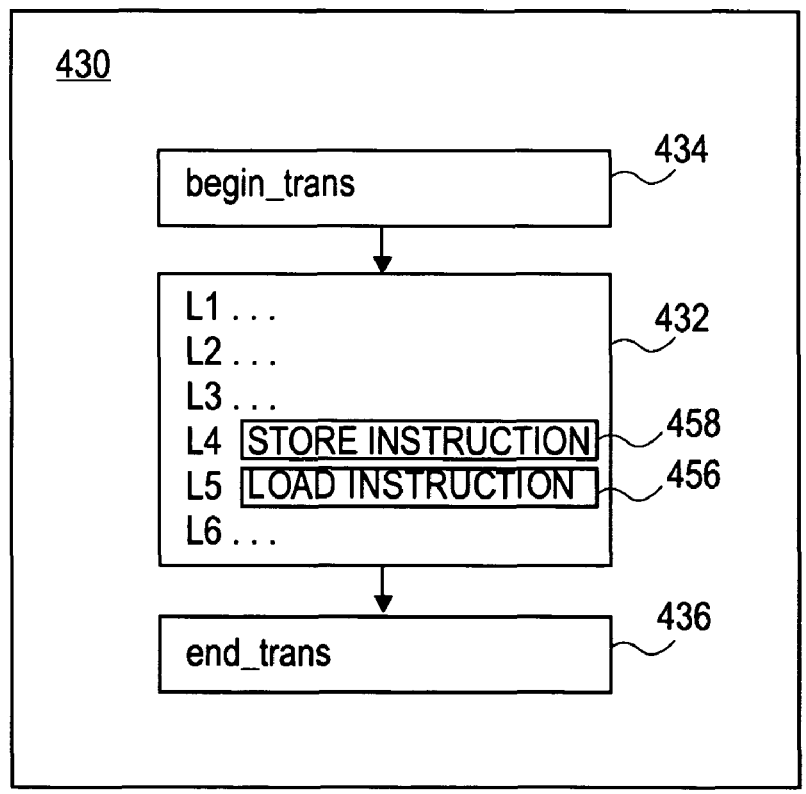

Referencing FIG. 4B, aggressively optimized code region 432 is in a transaction 430, as indicated by its placement between begin-transaction instruction ("begin_ins") 434 and end-transaction instruction ("end_trans") 436. In optimized code region 432 the instructions of unoptimized code region 440 have been reordered. Load instruction 456 is now at L5, following store instruction 458 at L4.

If the execution of store instruction 458 causes an exception, transaction 430 may be aborted and the exception precisely handled as described above with reference to FIGS. 2 and 3. For example, the memory address for the entry point at L1 to unoptimized code region 440 and the processor state associated with that entry point could be recovered. The unoptimized code region 440 could then be executed.

Figure 5A:
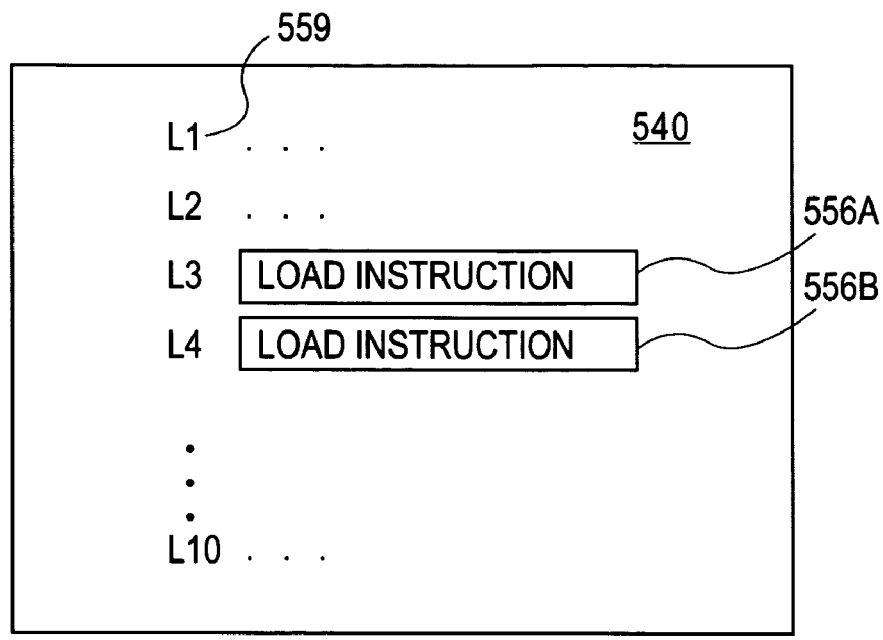
FIGS. 5A and 5B illustrate a method of aggressively optimizing code by reordering loads within a transaction, in accordance with an embodiment of the present invention.

Referencing FIG. 5A, unoptimized code region 540 begins with instruction 559 at L1, includes a first load instruction 556A at L3, includes a second load instruction 556B at L4, and ends at L4. For purposes of this discussion, it is assumed that the code would be more efficient if the first load instruction 556A could be reordered to follow the second load instruction 556B. However, it is possible that load instructions 556A, 556B may cause a segmentation errors and thus cause exceptions. Precise handling of the exceptions requires having the exception handler encounter the exceptions in the same order as if the unoptimized code 540 had raised the exceptions. Moving first load instruction 556A to, for example, L5 would change the order of the potential segmentation error exceptions. Therefore, without transactional memory support, a dynamic optimizer may forego this reordering optimization.

Figure 5B:
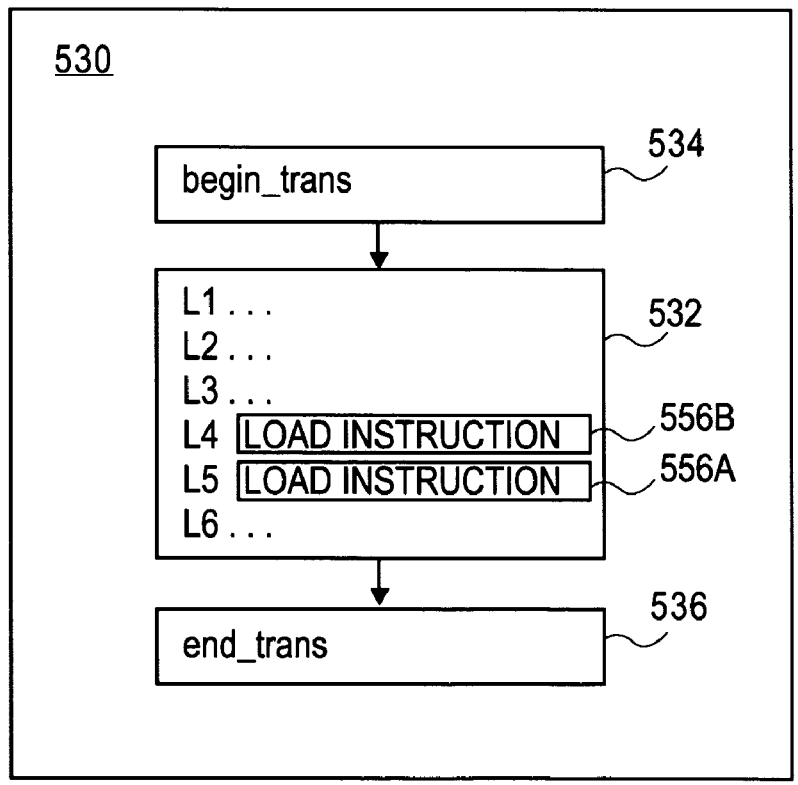

Referencing FIG. 5B, aggressively optimized code region 532 is in a transaction 530, as indicated by its placement between begin-transaction instruction ("begin_ins") 534 and end-transaction instruction ("end_trans") 536. In optimized code region 532 the instructions of unoptimized code region 540 have been reordered. First load instruction 556A is now at L5, following second load instruction 556B at L4. If the execution of the load instructions 556A, 556B causes exceptions, transaction 530 may be aborted and the exception is precisely handled as described above with reference to FIGS. 2 and 3. The exception handler will see the exceptions in the original order according to the nonoptimized code. Similar considerations apply when reordering store, floating point and other exception instructions.

Figure 6A:
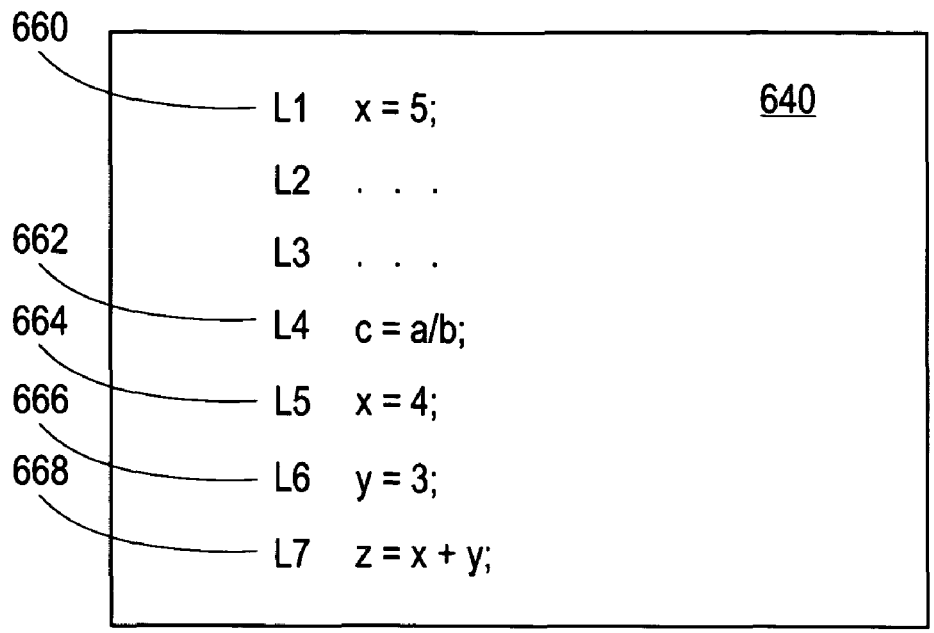
FIGS. 6A and 6B illustrate a method of aggressively optimizing code by eliminating dead code within a transaction, in accordance with an embodiment of the present invention.

Transactional memory may support other types of aggressive optimizations, for example, dead code removal. Referencing FIG. 6A, unoptimized code region 640 begins with an instruction 660 at L1 that loads the value 5 into variable x. The code region 640 continues with instructions at L2-L4. However, none of the instructions at L2-L4 use the value of x. Instead, these instructions load values into variables a and b, divide a by b, and store the result into variable c. The instruction 662 at L4 is a floating point division operation which is an exception instruction—that is, it may cause an exception. This would occur, for example, if the value of b were zero. Unoptimized code region 640 continues at L5 with an instruction 664 that stores the value 4 into variable x. Finally instruction 666 at L6 stores 3 into variable y and instruction 668 at L7 adds x and y and stores the sum in variable z. Thus, without an exception, the store of 5 into x by instruction 660 at L1 is never used. It is dead code. A possible optimization is to remove the dead code instruction 660.

However, removing dead code instruction 660 would change the processor state prior to floating point division instruction 662, an instruction that may cause an exception. Removing instruction 660 may therefore prevent an exception handler from recovering the processor state associated with unoptimized code 640 immediately prior to instruction 662. Therefore, without the support of transactional memory, a dynamic optimizer may forego removal of the dead code instruction 660.

Figure 6B:
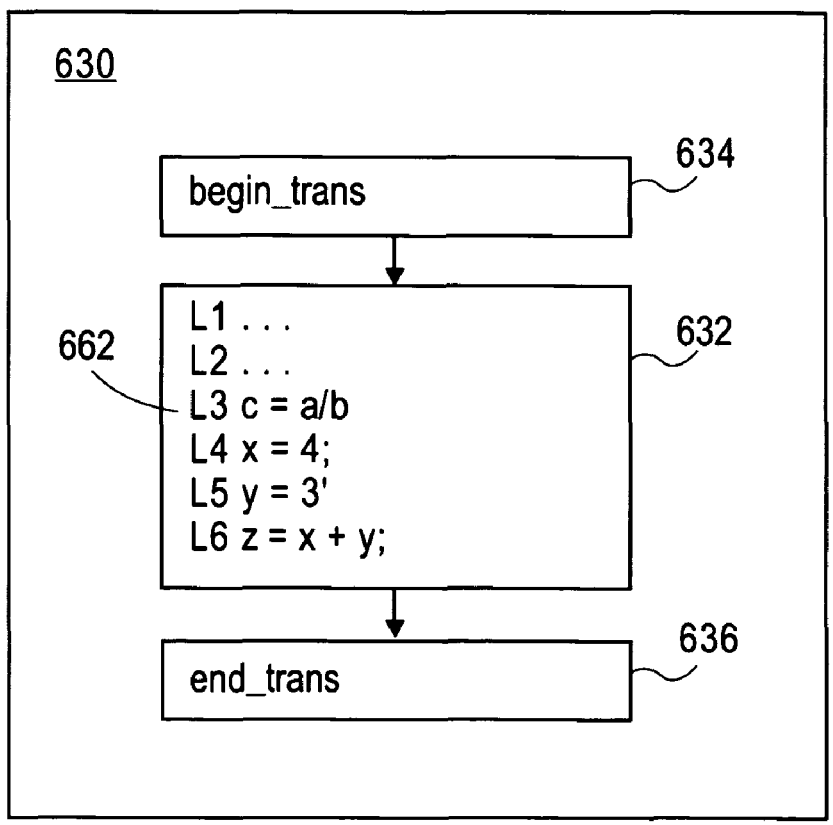

Referencing FIG. 6B, aggressively optimized code region 632 is in a transaction 630, as indicated by its placement between begin-transaction instruction ("begin_ins") 634 and end-transaction instruction ("end_trans") 636. In optimized code region 632, dead code instruction 660 of FIG. 4A has been removed. If the execution of floating point instruction 662 causes an exception, transaction 630 may be aborted and the exception precisely handled as described above with reference to FIGS. 2 and 3.

D. Selection of Portions of Application Code for Conversion to Transactions

Further referencing FIG. 1, source binary code 104 may include multi-threaded code, code with multiple processes, or code that is executed on different cores of a multi-core processor. Transactions benefit parallel programming because each thread or process may be more aggressively optimized as compared to the less aggressive optimizing possible without support of transactional memory. However, despite the overall benefit of using transactions to support aggressive dynamic binary optimization, aborts are costly to performance. Therefore methods for reducing aborts are desired.

Aborts occur when the write set of a transaction executing in one thread, process, or core conflicts with the read/write set of another transaction that is executing on another thread, process or core. Two complementary techniques are described for using transactions to support parallel programming while minimizing aborts.

First, the dynamic optimizer uses common idiom to identify shared (including volatile) variable accesses. For example if a variable appears in a cmpxchg instruction, it is often an access to a shared variable. Also, if a variable controls a spin loop, the variable is usually a shared variable. The list of shared variable may be identified conservatively and maintained as a set of memory ranges organized as a hash table. This data structure is then used to check for shared variables in code regions being considered for conversion to a transaction. Code regions with a shared variable are then not allowed to be converted to transactions. This technique is further discussed below with reference to FIG. 7.

Second, if a transaction aborts due to a conflict being detected, a region coded as a transaction is retranslated without using a transaction to avoid an abort occurring in that code region in the future. The handling of aborts and the retranslating of code regions have already been described above with reference to FIGS. 2 and 3.

Figure 7:
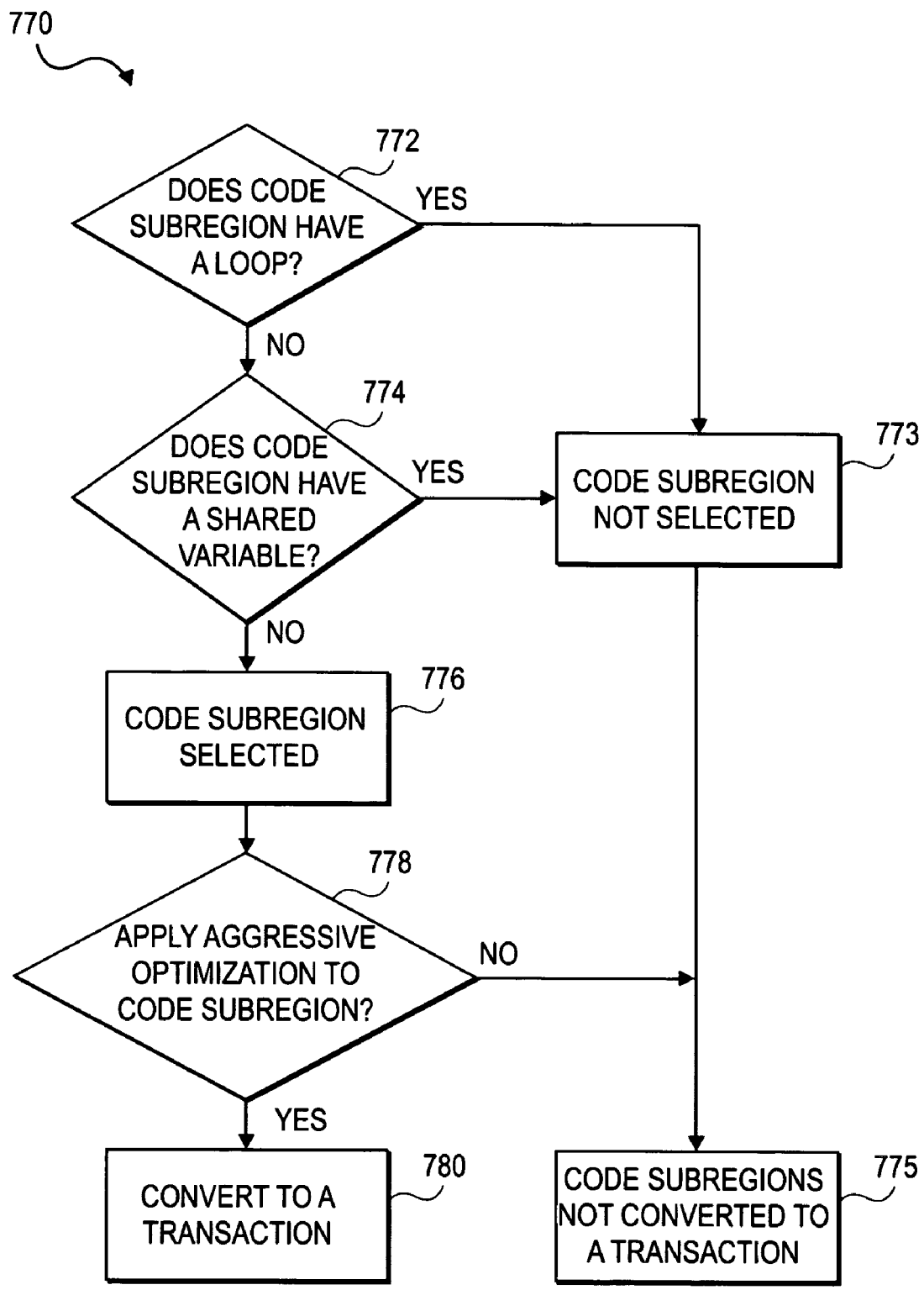
FIG. 7 is a flowchart showing a method for selecting code regions to convert to transactions in accordance with an embodiment of the present invention.

Referencing FIG. 7, a method 770, consistent with one embodiment, for determining whether to convert a code subregion as a transaction includes determining whether the code subregion has a loop. (Process block 772). In another embodiment the decision may be whether a code region, as contrasted with a code subregion, has a loop. However, a subregion of a code region may meet conditions to be coded as a transaction even though the entire code region does not. For consistency, this discussion refers to making determinations at the code subregion level—even though in some embodiments entire code regions may be coded as transactions. Moreover, the discussion could accurately and generically refer to portions of application code, because both code regions and code subregions are portions of the application code. A portion of application code being considered as a possible transaction may also be referred to a candidate portion of the application code.

If the code subregion does have a loop, then the code subregion is not selected as a possible transaction. (Process block 773). If the code subregion does not have a loop, then it is further considered as a possible transaction. A code region may have a loop, but a subregion may include only the code within the loop that is executed each time when the loop iterates. The entire code region is not selected as a possible transaction, but the code subregion is selected as a possible transaction.

Continuing with method 770, it is determined whether the code subregion has a shared variable. (Process block 774). As discussed above, if a variable appears in a cmpxchg instruction or if the variable controls a spin loop, then the variable is likely a shared variable.

In one embodiment, the determination is made conservatively. Sections of code located between accesses to possible shared variables are considered as having a shared variable. These sections of code are identified as a set of memory ranges organized as a hash table.

Figure 8:
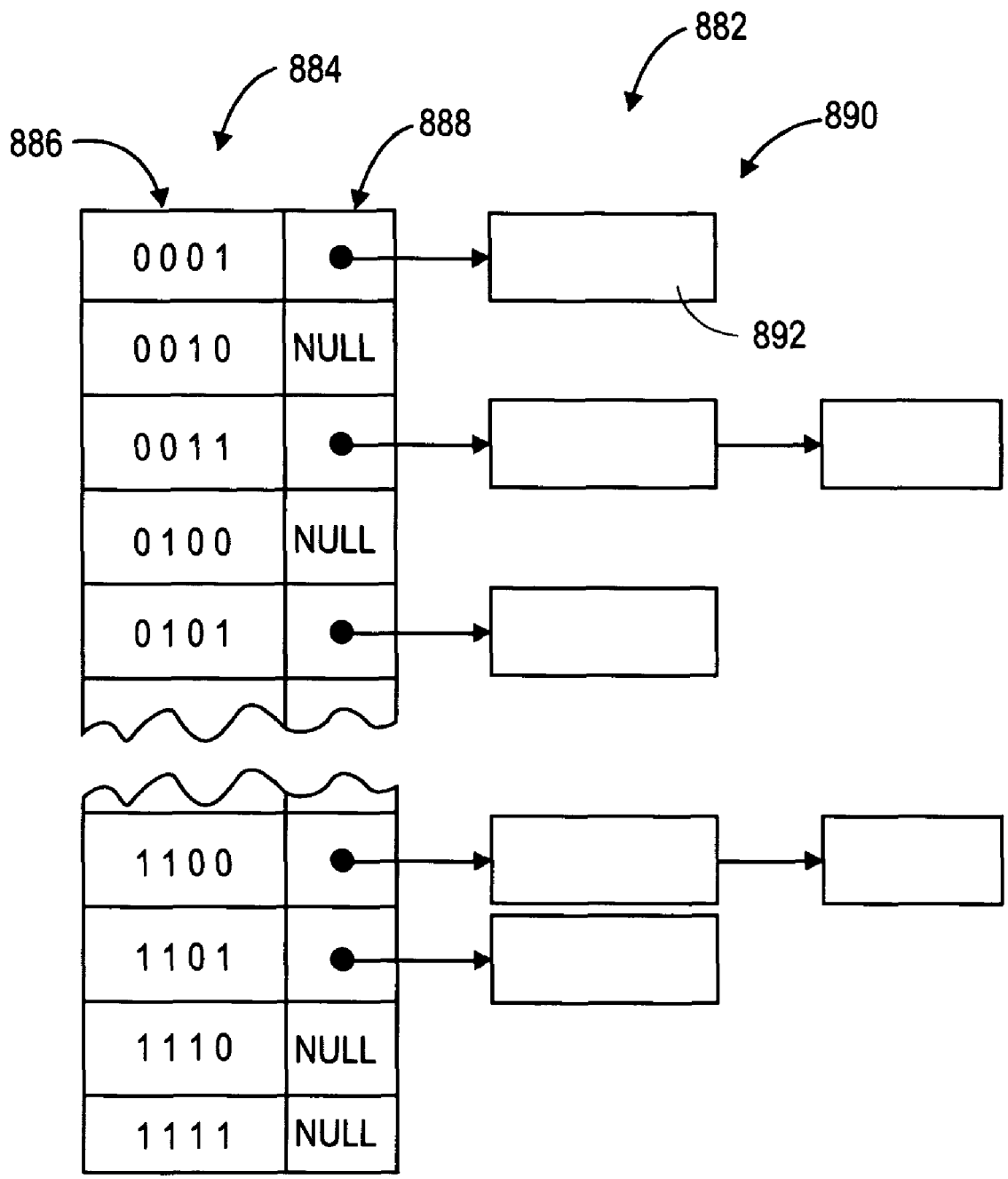
FIG. 8 illustrates a data structure for use in the method of FIG. 7.

Referencing FIG. 8, in one embodiment a hash table 882 includes an array 884 that includes keys 886 into the hash table and pointers 888 to linked lists, for example, linked list 890. Elements 892 of linked lists, for example linked list 890, include memory address ranges corresponding to shared variables. The hash table 882 may be used to determine if a variable in a code subregion is designated as a shared variable.

For example, the high order bits of the memory address of the variable "x" are used as a key 886 into the hash table 882. If the pointer 888 associated with the key 886 for the variable x is null, then the variable x is determined not to be a shared variable. If the pointer 888 is not null, then the linked list 890 is traversed to determine if x's memory address matches a memory address range stored in a node 892. If there is no match, then the variable x is determined not to be a shared variable. If there is a match, then the variable x is identified as a shared variable. This is just one of many possible implementations and is given merely as an example.

Further referencing FIG. 7, if a code subregion is determined to have a shared variable, then it is not selected as a possible transaction. (Process block 773). And the code subregion is not coded as a transaction. (Process block 775). If the code subregion is determined not to have a shared variable, then it is selected for consideration as a transaction. (Process block 776).

Code regions without loops or shared variables are evaluated to determine whether to apply a group of aggressive optimizations to the code region. (Process block 778). As used here, aggressive optimization refers to optimizations that depend on transactional memory for precise exception handling, as discussed above with reference to FIGS. 4A-6B. If the execution performance of a code region or subregion would not benefit from an aggressive optimization, it is not converted to a transaction. (Process block 775). However, if the execution performance of a code region or subregion would benefit from an aggressive optimization, then it is converted to a transaction and the aggressive optimization is applied to the code region or subregion. (Process block 780).

E. System Implementation

Figure 9:
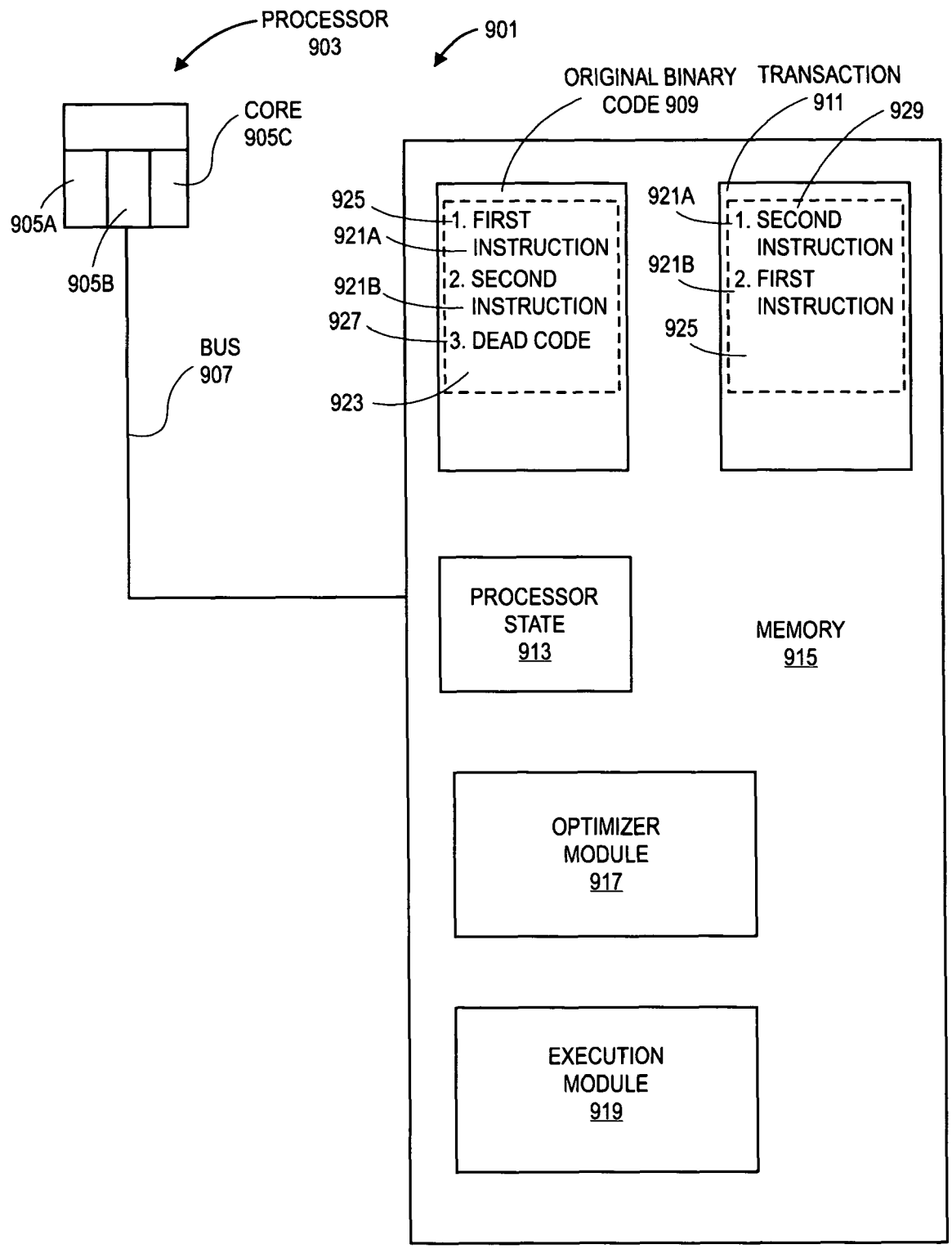
FIG. 9 is a block diagram of a machine that uses transactions for precise exception-handling in accordance with an embodiment of the present invention.

Referencing FIG. 9, a machine (such as, for example, a computer) 901, according to one embodiment, includes a processor 903 with multiple cores 905A-905C connected to a bus 907 for communication with memory 915. Stored in memory 915 is a portion of original unoptimized binary code 909. Memory 915 also stores processor state 913 associated with an entry-point 925 to the original unoptimized binary code 909.

Also stored in memory 915 is a transaction 911, which includes optimized binary code 929 that is an optimized version of the original unoptimized binary code 909. The optimized binary code 929 of transaction 911 does not include any loops. Further, the optimized binary code 929 of transaction 911 does not include any shared variables.

Memory 915 includes an execution module 919 to instruct the processor 901 to execute the transaction 911. Consistent with the methods described with reference to FIGS. 2 and 3, execution module 919 is to instruct the processor 903 that if an exception occurs during the execution of the transaction 911, to abort the transaction, recover processor state 913 and reentry point 925. The processor 901 is to use the recovered processor state 913 and reentry point 925 to execute the original unoptimized binary code 909.

Memory 915 also includes an optimizer module 917 that applies optimizations to binary code. These optimizations are reflected in the optimized binary code 929 of the transaction 911, which includes aggressive optimization supported by transactional memory for precise exception handling. Original unoptimized binary code 909 includes an ordered sequence 923 of instructions, including a first instruction 921A and a second instruction 921B. The ordered sequence corresponds to the flow of control—that is, the order in which the instructions are to be executed by the processor 901. In the ordered sequence 923 of the original unoptimized binary code 909, the first instruction 921A precedes the second instruction 921B.

The transaction 911 also has an ordered sequence 925 of instructions, including the first instruction 921A and the second instruction 921B. However, in contrast to their order in the ordered sequence 923 of the original unoptimized binary code 909, in the ordered sequence 925 of the transaction 911, the first instruction 921A succeeds the second instruction 921B. This change in sequence reflects a code reordering pursuant to an aggressive optimization having transactional memory support for precise exception handling.

In one embodiment the first instruction 921A is a load instruction and the second instruction 921B is a store instruction. Thus, an exception instruction has been moved downward in the flow of instructions past an irreversible instruction—one that would irretrievably change the processor state of processor 903 absent the transaction 911 for precise exception handling.

In another embodiment, both the first instruction 921A and the second instruction 921B are load instructions. In yet another embodiment, the first instruction 921A is a load instruction and the second instruction is a floating point instruction. Various other possibilities exist, as discussed relative to FIGS. 4A to 6B.

In one embodiment, dead code instruction 927 is present in the original unoptimized binary code 909, but is not present in the optimized binary code 929 of transaction 911. This reflects an aggressive optimization supported by transaction 911.

In one embodiment, the optimized binary code 929 of transaction 911 is a translation of the original binary code 909. The original source binary code 909 comprises an ISA that is not native to machine 901. The optimized binary code 929 of transaction comprises an ISA that is native to machine 901. The optimization of the original unoptimized binary code 909 having been applied in connection with the translation to the ISA of the optimized binary code of the transaction 911. In a particular embodiment, the ISA that is not native to machine 901 is 32-bit IA and the ISA that is native to the machine is 64-bit IA.

In one embodiment, instead of original unoptimized binary code 909, memory 915 stores original optimized binary code that is less aggressively optimized than the optimized binary code of transaction 911. In a particular embodiment, the original less aggressively optimized code has had optimizations applied that allow precise exception handling without the support of transactional memory. In contrast, optimized binary code of transaction 911 has had optimizations applied that may not allow precise exception handling without the support of transactional memory.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering or simultaneously, as one or ordinary skill would appreciate based at least on the teachings provided herein.

Embodiments of the present invention may be described in sufficient detail to enable those skilled in the art to practice the invention. Other embodiments may be utilized, and structural, logical, and intellectual changes may be made without departing from the scope of the present invention. Moreover, it is to be understood that various embodiments of the invention, although different, are not necessarily mutually exclusive. For example, a particular feature, structure, or characteristic described in one embodiment may be included within other embodiments. Accordingly, the detailed description is not to be taken in a limiting sense.

The foregoing embodiments and advantages are merely exemplary and are not to be construed as limiting the present invention. Those skilled in the art can appreciate from the foregoing description that the techniques of the embodiments of the invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

The invention claimed is:

1. A method of dynamically optimizing code, comprising:
    simultaneously optimizing and executing application code on a machine, the optimizing comprising:
        determining if a portion of the application code has a shared variable and a loop, the shared variable being a variable that, upon execution of the portion, is accessed by two or more threads, processes or processors;
        responsive to determining the portion does not have the shared variable and the loop, selecting the portion of the application code;
        determining whether to apply one or more optimizations to the portion, the determining based, at least in part, on whether an execution performance of the portion benefits from the one or more optimizations, wherein the one or more of a group of optimizations is selected from a group consisting of reordering load instructions within the portion, removing dead code within the portion, and reordering a load instruction in a location where it precedes a store instruction of the portion to a location in the code portion where it is subsequent to the store instruction; and
        responsive to determining to apply the one or more optimizations to the portion, converting the portion to a transaction and applying the of one or more optimizations to the portion, the transaction having a property, that when the transaction is executed, the transaction is either atomically committed or atomically aborted.

2. The method of claim 1, wherein determining whether the portion has a shared variable comprises:
    creating a data structure having memory addresses associated with shared variables; and
    for each variable in the portion, determining whether the variable corresponds to a memory address stored in the data structure.

3. The method of claim 1 wherein the portion comprises intermediate representation (IR) code and the method further comprises translating an original binary code into the IR code.

4. The method of claim 3, further comprising translating the IR code of the portion of the application code to a target binary code with an instruction set architecture that is native to the machine.

5. The method of claim 1 wherein applying the one or more optimizations to the portion comprises storing in a memory a version of the portion without the one or more optimizations applied (the "backup code portion") and storing a machine state associated with an entry-point of the stored backup code portion.

6. The method of claim 5, further comprising: executing the portion, and if the portion is converted to a transaction and if an exception is generated during execution of the portion, then handling the exception, the handling comprising:
    catching the exception;
    aborting the transaction;
    retrieving the backup code portion and the stored associated machine state; and
    executing the backup code portion using the stored machine state.

7. The method of claim 1, wherein the one or more optimizations comprises reordering instructions to move an exception instruction from a location in the code portion where it precedes an irreversible instruction to a location where it is subsequent to the irreversible instruction.

8. An apparatus, comprising:
    a memory to store application code;
    a processor to access the application code in the memory;
    an optimizer module to instruct the processor to access the memory to:
        determine if a portion of the application code has a shared variable and a loop, the shared variable being a variable that, upon execution of the portion, is accessed by two or more threads, processes or processors;
        responsive to determining the portion does not have the shared variable and the loop, select the portion of the application code;
        determine whether to apply one or more optimizations to the portion, the determining based, at least in part, on whether an execution performance of the portion benefits from the one or more optimizations, wherein the one or more of a group of optimizations is selected from a group consisting of reordering load instructions within the portion, removing dead code within the portion, and reordering a load instruction in a location where it precedes a store instruction of the portion to a location in the code portion where it is subsequent to the store instruction;
        responsive to determining to apply the one or more optimizations to the portion, convert the portion to a transaction and applying the of one or more optimizations to the portion, the transaction having a property, that when the transaction is executed, the transaction is either atomically committed or atomically aborted; and
    an execution module to instruct the processor to access the selected portion in the memory, to execute the selected portion and, if the portion has been converted to the transaction, to perform at least one of aborting and committing the transaction.

9. A machine comprising:

a processor;

a memory communicably coupled to the processor and to store a first version of a portion of binary code, a processor state associated with an entry point to the first version of the portion binary code, and a transaction, the transaction comprising a second version of the portion of binary code that is optimized relative to the first version of the portion of binary code, the second version of the portion of binary code is optimized by:

determining if a portion of the application code has a shared variable and a loop, the shared variable being a variable that, upon execution of the portion, is accessed by two or more threads, processes or processors;

responsive to determining the portion does not have the shared variable and the loop, selecting the portion of the application code;

determining whether to apply one or more optimizations to the portion, the determining based, at least in part, on whether an execution performance of the portion benefits from the one or more optimizations, wherein the one or more of a group of optimizations is selected from a group consisting of reordering load instructions within the portion, removing dead code within the portion, and reordering a load instruction in a location where it precedes a store instruction of the portion to a location in the code portion where it is subsequent to the store instruction;

responsive to determining to apply the one or more optimizations to the portion, converting the portion to a transaction and applying the of one or more optimizations to the portion, the transaction having a property, that when the transaction is executed, the transaction is either atomically committed or atomically aborted;

a bus communicably coupled to the memory and the processor; and an execution module to instruct the processor to execute the transaction, and if an exception occurs during the execution of the transaction, to abort the transaction, to retrieve the first version of the portion of binary code and the processor state, and to use the processor state to execute the first version of the portion of binary code.

10. The machine of claim 9, wherein:

the first version of the portion of binary code comprises a first instruction and a second instruction in a first ordered code sequence, the first ordered code sequence having the first instruction preceding the second instruction; and the second version of the portion of binary code comprises the first and the second instructions in a second ordered code sequence, the second ordered code sequence having the first instruction succeeding the second instruction.

11. The machine of claim 10, wherein the first instruction is a load instruction and the second instruction is a store instruction.

12. The machine of claim 10, wherein the first instruction is a load instruction and the second instruction is a floating point instruction.

13. The machine of claim 10, wherein the first instruction is a load instruction and the second instruction is another load instruction.

14. The machine of claim 10, wherein the first instruction is an exception instruction and the second instruction is an irreversible instruction.

15. The machine of claim 9, wherein the first version of the portion of binary code comprises a dead code instruction and the second version of the portion of binary code does not comprise the dead code instruction.

16. The machine of claim 9, wherein the first version of the portion of code comprises an instruction set architecture that is not native to the machine; and wherein the second version of the portion comprises an instruction set architecture that is native to the machine.

17. The machine of claim 16 wherein the first version of the code portion comprises 32-bit Intel Architecture (IA) binary code and the second version of the portion comprises 64-bit IA binary code.

* * * * *